United States Patent [19]

Jones, Jr.

[11] Patent Number: 5,188,495
[45] Date of Patent: Feb. 23, 1993

[54] FASTENER ASSEMBLY USEFUL AS DRAIN PLUG

[75] Inventor: James D. Jones, Jr., Southfield, Mich.

[73] Assignee: Illinois Tool Works Inc., Glenview, Ill.

[21] Appl. No.: 843,204

[22] Filed: Feb. 28, 1992

[51] Int. Cl.⁵ .................. F16B 33/00; F16B 43/02
[52] U.S. Cl. .................. 411/369; 411/533; 411/542; 285/220; 285/918
[58] Field of Search ............ 411/369, 370, 542, 533, 411/915; 285/220, 918; 277/214

[56] References Cited

U.S. PATENT DOCUMENTS

| | | | |
|---|---|---|---|
| 3,062,557 | 11/1962 | Underwood | 411/369 |
| 3,399,589 | 9/1968 | Breed | 411/369 |
| 3,726,178 | 4/1973 | Dimitry | 411/369 |
| 3,746,348 | 7/1973 | Stone | 285/918 |
| 4,531,767 | 7/1985 | Andreolla | 285/220 |
| 4,701,088 | 10/1987 | Crull | 411/369 |
| 4,702,657 | 10/1987 | Jelinek | 411/369 |

Primary Examiner—Neill R. Wilson
Attorney, Agent, or Firm—Schwartz & Weinrieb

[57] ABSTRACT

A fastener assembly comprises a metal screw and a sealing ring made from an elastomeric material and is useful, in an exemplary application, as a drain plug for an oil pan for an internal combustion engine. The screw head has an undercut, annular recess, within which the sealing ring is seated. The sealing ring has a sealing portion, which when unstressed has an axial thickness smaller than the recess depth, and an adjoining portion or web extending radially inwardly. When unstressed, the adjoining portion has an inner diameter smaller than the major diameter of the threaded portion of the screw shank. The sealing ring when unstressed has an outer diameter larger than the outer diameter of the recess. Moreover, the recess volume is sufficient for the recess to contain the sealing ring over a wide range of cumulative, dimensional tolerances.

10 Claims, 2 Drawing Sheets

5,188,495

FASTENER ASSEMBLY USEFUL AS DRAIN PLUG

TECHNICAL FIELD OF THE INVENTION

This invention pertains to a fastener assembly comprising a metal screw and a sealing ring. In an exemplary application, the fastener assembly is useful as a drain plug for an oil pan of an internal combustion engine, as for a motor vehicle. The sealing ring is seated within an undercut, annular recess in the screw head. To avert problems encountered with such fastener assemblies heretofore and attributable to cumulative, dimensional tolerances, the ring and the recess are shaped to enable the ring to form a seal and to enable the recess to contain all of the ring over a wide range of such tolerances.

BACKGROUND OF THE INVENTION

Fastener assemblies comprising metal screws and sealing rings, such as O-rings made from synthetic rubber, are used widely in various sealing applications. In one widespread application, such fastener assemblies are used as drain plugs for oil pans of internal combustion engines, as for motor vehicles.

In one known arrangement, the screw head has an undercut, annular recess to accommodate an O-ring, which is intended to form a seal between the screw head and a workpiece when a threaded portion of the screw shank is driven into a threaded aperture in the workpiece. The aperture may have a countersink. See, e.g., Crull U.S. Pat. No. 4,701,088.

Problems are encountered with the known arrangement noted in the preceding paragraph and are attributable to cumulative, dimensional tolerances associated with the O-ring dimensions, the recess dimensions, and any countersink dimensions. One such problem is that, if the O-ring material has excessive volume relative to the recess and any countersink, the screw head cannot achieve metal-to-metal contact with the workpiece and can bear only against the O-ring material. Eventually, the O-ring material exhibits cold flow, which results in a loosened seal. Another such problem is that, if the O-ring material has insufficient volume relative to the recess and any countersink, an effective seal is not achievable. These two problems present particular difficulties when the fastener assembly is used as a drain plug for an oil pan of an internal combustion engine, as for an automobile or a truck, in which oil leaks can lead to severe engine damage.

There has been a need, to which this invention is addressed, for improvements averting both of these problems in such a fastener assembly.

SUMMARY OF THE INVENTION

This invention provides a fastener assembly useful with a metal workpiece having a sealing surface and a threaded aperture opening from the sealing surface. Because it does not exhibit either of the problems noted above, the fastener assembly provided by this invention can be advantageously used as a drain plug for an oil pan of an internal combustion engine, as for an automobile or a truck.

The fastener assembly provided by this invention comprises a metal screw having a head and a shank adjoining the head and defining an axis. The head has an undercut, annular recess with an axial depth. The recess may be generally rectangular when viewed in a radial plane through the axis defined by the shank. The shank has a threaded portion with a major diameter.

Also, the fastener assembly provided by this invention comprises a sealing ring made from an elastomeric material, such as synthetic rubber. The sealing ring is seated within the recess. To avert both of the problems noted above, the ring and the recess are shaped to enable the ring to form a seal and to enable the recess to contain all of the ring over a wide range of cumulative, dimensional tolerances in the metal screw, in the sealing ring, and in the metal workpiece.

The sealing ring is made so as to have a special shape relative to the recess and has a sealing portion and an adjoining portion extending from the sealing portion. The sealing ring is made so that its volume is substantially less than the volume of the recess. Preferably, the sealing ring is made so that the sealing portion, which may resemble an O-ring, has an axial thickness greater than the axial depth of the recess. Preferably, the sealing ring is made so that the adjoining portion, which may extend radially inwardly from the sealing portion, has an axial thickness smaller than the axial depth of the recess. When the sealing ring is seated within the recess so that the sealing portion extends radially from the recess before the fastener assembly is mounted to such a workpiece, the adjoining portion serves an important function, by positioning the sealing ring concentrically within the recess.

The fastener assembly is arranged so that, when the threaded portion of the shank is threaded into the threaded aperture until the head bears against the sealing surface of the workpiece in metal-to-metal contact, the sealing ring is compressed into the recess. The sealing portion is compressed axially to form a seal with the sealing surface of the workpiece. It is important for the recess volume to be sufficiently greater than the volume of the sealing ring when compressed into the recess to contain all of the sealing ring over a wide range of cumulative, dimensional tolerances in the metal screw, in the sealing ring, and in the metal workpiece.

Preferably, the sealing ring is made so that the adjoining portion when unstressed has an inner diameter smaller than the major diameter of the threaded portion of the shank so as to retain the sealing ring on the screw. Preferably, the sealing ring when unstressed has an outer diameter larger than the outer diameter of the recess, so that the sealing ring fits snugly into the recess before the sealing ring is compressed. the recess before the sealing ring is compressed.

BRIEF DESCRIPTION OF THE DRAWINGS

These and other objects, features, and advantages of this invention are evident from the following description of a preferred embodiment of this invention with reference to the accompanying drawings, in which like reference characters designate like or corresponding parts throughout the several views, and wherein.

DETAILED DESCRIPTION OF PREFERRED EMBODIMENT

Figure 2:
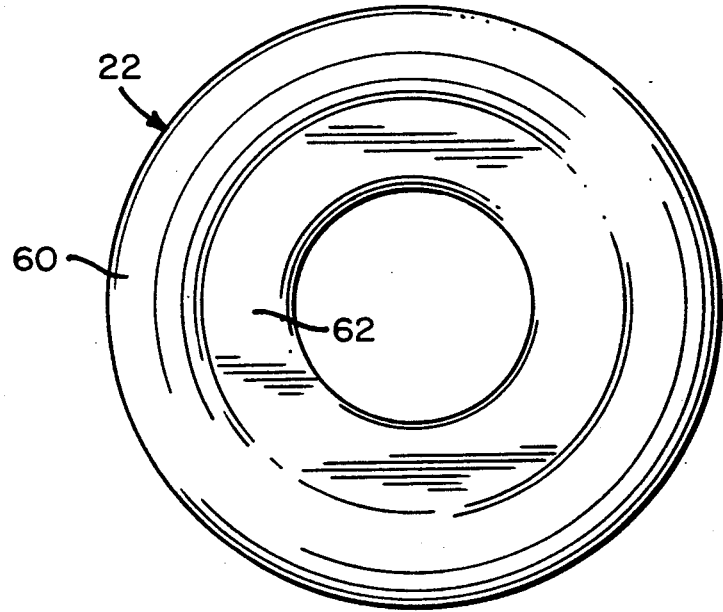
FIG. 2 is a plan view of the sealing ring apart from the metal screw.
Figure 4:
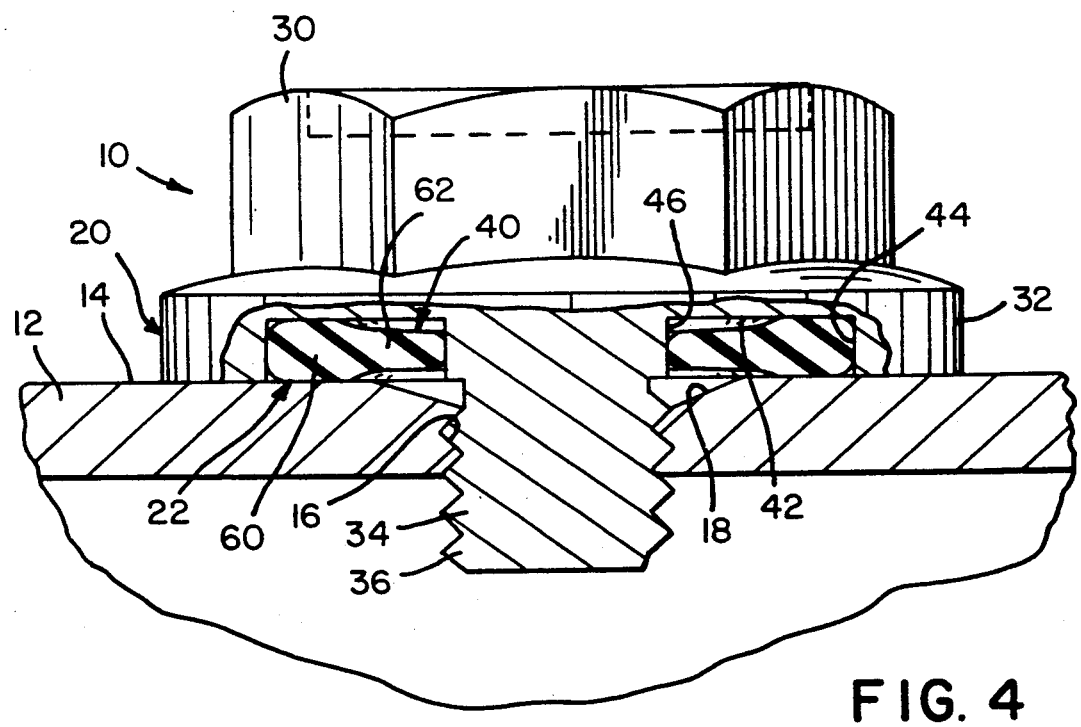
FIG. 4 is a partly sectioned, elevational view showing the fastener assembly mounted to a metal workpiece having a threaded aperture, into which the threaded portion of the screw shank is threaded.

As shown in the drawings, a fastener assembly 10 constitutes a preferred embodiment of this invention. As shown in FIG. 4, the fastener assembly 10 is mountable to a metal workpiece 12 having a sealing surface 14 and a threaded aperture 16 opening from the sealing surface 14. As shown, the workpiece has a frusto-conical countersink 18, where the aperture 16 opens from the sealing surface 14. The fastener assembly 10 comprises a metal screw 20 and a sealing ring 22 made from an elastomeric material, such as synthetic rubber or polypropylene. The sealing ring 22, which is shown separately in FIG. 2, is molded from the elastomeric material. Because of this invention, the fastener assembly 10 is effective over a wide range of cumulative, dimensional variations in the metal screw 20, in the sealing ring 22, and in the metal workpiece 12.

In one application contemplated by this invention, the metal workpiece 12 is an oil pan of an internal combustion engine, as for an automobile or a truck, and the fastener assembly 10 is a drain plug for the oil pan. For such an application, the sealing ring 22 is made from an elastomeric material that does not degrade when exposed to motor oil, polypropylene being a suitable material. In such an application, the fastener assembly 10 and the metal workpiece 12 would be inverted from their positions in FIGS. 1, 3, and 4. The fastener assembly 10 is expected to be also useful in other similar and dissimilar applications.

The screw 20 has a driving head 30, which includes an integral washer 32, and an integral shank 34 adjoining the integral washer 32 and defining an axis. The shank has a threaded portion 36 with a major (crest) diameter. Where the shank 34 adjoins the integral washer 32, the shank 34 has a short portion 38 with a diameter less than the major diameter of the threaded portion 36.

In the integral washer 32, the head 30 has an undercut, annular recess 40, which is generally rectangular when viewed in a radial plane. See, e.g., FIG. 1. The recess 40 has an annular sealing surface 42, an outer cylindrical surface 44 with a diameter defining the outer diameter of the recess 40, and an inner cylindrical surface 46 defining the inner diameter of the recess 40. The head 30 has an outer, annular bearing surface 48, as shown. The recess 40 has a volume measured between the sealing surface 42 and a plane comprising the bearing surface 48. The recess 40 has an axial depth measured therebetween.

Preferably, as shown, the diameter of the inner cylindrical surface 46 is equal approximately to the major diameter of the threaded portion 36 of the shank 34. Preferably, as shown, the difference between the radius of the outer cylindrical surface 44 and the radius of the inner cylindrical surface 46 is approximately three times the axial depth of the recess 40.

The sealing ring 22 is made so as to have a special shape relative to the recess 40. As shown, the sealing ring 22 is made so as to have a sealing portion 60 and an adjoining portion or web 62, which extends radially inwardly from the sealing portion 60. The sealing portion 60 resembles an O-ring, which has a diameter defining the axial thickness of the sealing portion 60.

Figure 1:
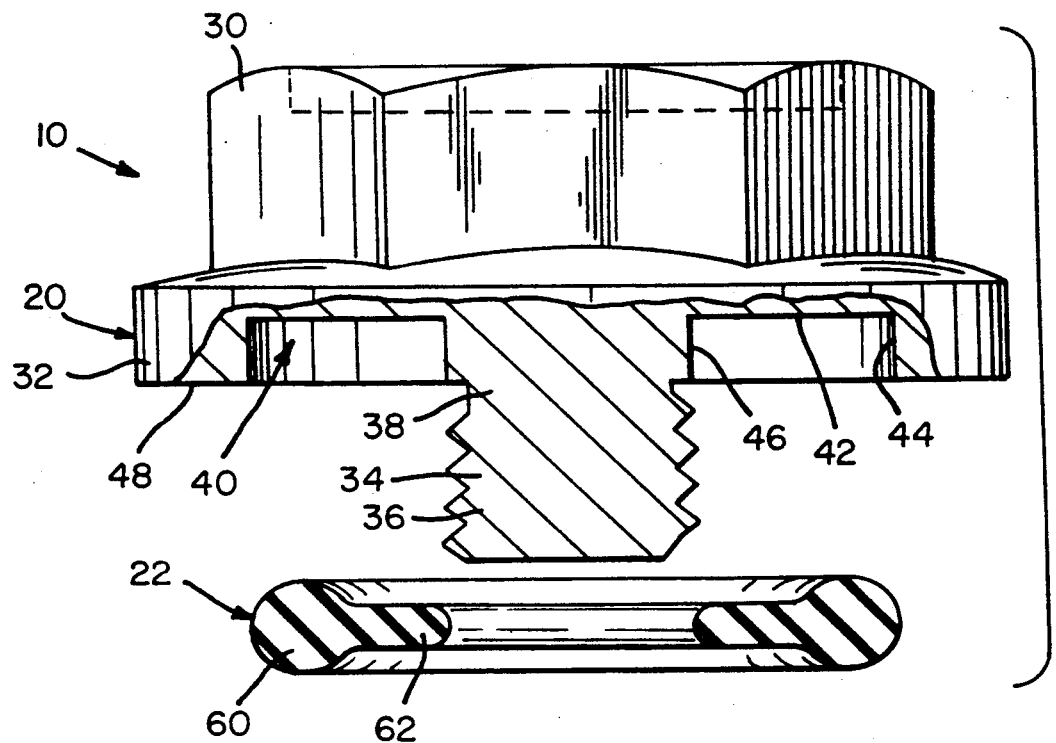
FIG. 1 is an exploded, elevational view partially sectioned along a radial plane to show a fastener assembly according to this invention and comprising a metal screw and a sealing ring.
Figure 3:
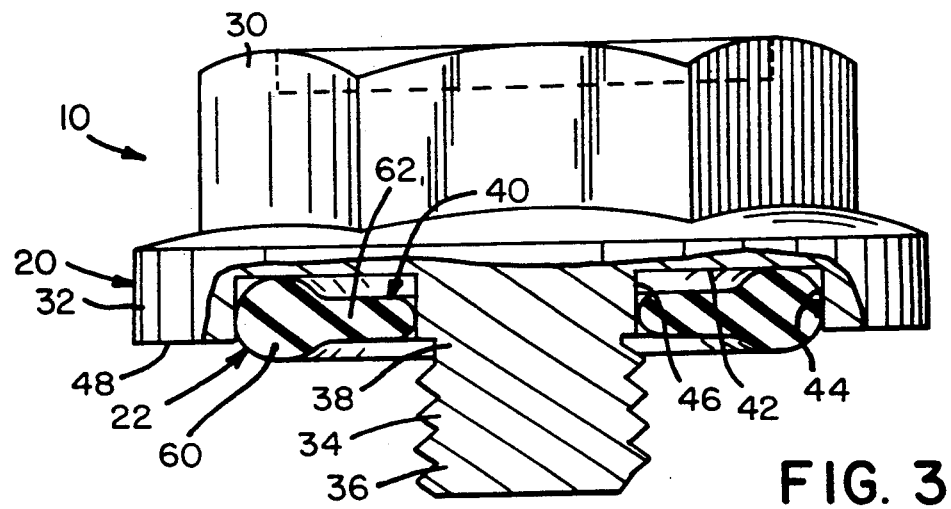
FIG. 3 is a partly sectioned, elevational view showing the sealing ring seated within an undercut, annular recess in the screw head, as the fastener assembly is assembled before being mounted to a metal workpiece.

The sealing ring 22 is made so that, when it is unstressed, the axial thickness of the sealing portion 60 is substantially greater than the axial depth of the recess 40. Preferably, as shown in FIG. 1, the axial thickness of the sealing portion 60 is approximately four-thirds the axial depth of the recess 40. Thus, as shown in FIG. 3, the sealing portion 60 extends axially from the recess 40 when the sealing ring 22 is seated within the recess 40 so that the sealing portion 60 engages the sealing surface 42 before the fastener assembly 10 is mounted to the workpiece 12. Also, as shown in FIG. 3, the adjoining portion 62 positions the sealing ring 22 concentrically within the recess 40 before the fastener assembly 10 is mounted to the workpiece 12.

The sealing ring 22 is made so that, when it is unstressed, the adjoining portion 62 has an axial thickness substantially smaller than the axial depth of the recess 40. Preferably, as shown in FIG. 1, the axial thickness of the adjoining portion 62 (except at its outer and inner extremities) when the sealing ring 22 is unstressed is approximately one-half the axial thickness of the sealing portion 60 and approximately two-thirds the axial depth of the recess 40.

The sealing ring 22 is made so that, when it is unstressed, the adjoining portion 62 has an inner diameter slightly smaller than the major diameter of the threaded portion 36 of the screw shank 34 and slightly smaller than the diameter of the inner cylindrical surface 46 of the recess 40 and the sealing portion 60 has an outer diameter slightly greater than the outer diameter of the recess 40. As the fastener assembly 10 is being assembled, the sealing ring 22 is stretched slightly as it is forced along the threaded portion 36 of the shank 34, toward the head 30. When the fastener assembly 10 is assembled properly, as shown in FIG. 3, the adjoining portion 62 embraces the inner cylindrical surface 46 snugly and the sealing portion 60 is confined snugly by the outer cylindrical surface so as to retain the sealing ring 22 in its seated position within the recess 40. However, even if the sealing ring 22 becomes dislodged accidentally so that the adjoining portion 62 surrounds the short portion 38 of the shank 34 between the integral washer 32 and the threaded portion 36 of the shank 34, the adjoining portion 62 retains the sealing ring 22 on the screw 20 until the sealing ring 22 is forced along the threaded portion 36 of the shank 34, away from the head 30.

The sealing ring 22 is made so as to have a volume substantially less than the volume of the recess 40 when the sealing ring 22 is unstressed. Thus, when the fastener assembly 10 is mounted to the workpiece 12, the volume of the recess 40 is sufficiently greater than the volume of the sealing ring 22 when compressed into the recess 40 to contain all of the sealing ring 22 over a wide range of cumulative, dimensional tolerances in the metal screw 20, in the sealing ring 22, and in the metal workpiece 12.

As shown in FIG. 4, the fastener assembly 10 is mountable to the workpiece 12 so that the threaded portion 36 of the shank 34 is threaded into the threaded aperture 16 until the bearing surface 48 on the integral washer 32 of the head 30 bears against the sealing surface 14 of the workpiece 12 in metal-to-metal contact. Thus, the sealing ring 22 is compressed into the recess 40. Also, the sealing portion 60 forms a seal with the head 30, at the sealing surface 42 of the recess 40, and a seal with the workpiece 12, at the sealing surface 14.

Moreover, the volume of the recess 40 is sufficiently greater than the volume of the sealing ring 22 when compressed into the recess 40 to contain all of the sealing ring 22 over a wide range of cumulative, dimensional tolerances in the metal screw 20, in the sealing ring 22, and in the metal workpiece 12. Although the countersink 18 may accommodate a small part of the adjoining portion 62, a countersink is not needed to accommodate any part of the sealing ring 22.

Various modifications may be made in the preferred embodiment described above without departing from the scope and spirit of this invention which is defined by means of the appended claims. It is therefore to be understood that within the scope of the appended claims, the present invention may be practiced otherwise than as specifically as described herein.

I claim:

1. A fastener assembly, to be mounted upon a workpiece having a sealing surface and a threaded aperture extending from said sealing surface and through said workpiece, comprising:

a screw having a head portion, and a shank portion integral with said head portion, said shank portion defining a longitudinal axis through said screw and being threaded for threaded engagement within said threaded aperture of said workpiece, and said head portion having an annular recess portion defined within a bearing surface portion thereof, for engaging said sealing surface of said workpiece, and surrounding said shank portion of said screw, said annular recess portion having a predetermined volume, a predetermined axial depth as defined from said bearing surface portion of said head portion to an axially recessed sealing surface of said recess portion, an outer peripheral surface, and an inner peripheral surface; and an annular sealing ring having an annular sealing portion and an annular web portion projecting radially from said annular sealing portion, said annular sealing ring having a volume which is less than said predetermined volume of said recess portion of said head portion of said screw so as to be capable of being entirely housed within said recess portion of said head portion of said screw when said screw is fully threadedly engaged within said workpiece, said annular sealing portion and said annular web portion of said annular sealing ring having peripheral portions which are disposed in contact with said inner and outer peripheral surfaces of said annular recess portion of said head portion of said screw such that said annular sealing ring is able to be seated and retained within said annular recess portion of said head portion of said screw prior to said fastener assembly being threadedly engaged within said workpiece, said annular sealing portion of said annular sealing ring having an axial depth which is greater than said predetermined axial depth of said annular recess portion of said head portion of said screw so as to project axially outwardly from said annular recess portion of said head portion of said screw prior to said screw being fully threadedly engaged within said workpiece as defined by said bearing surface portion of said head portion of said screw engaging said sealing surface of said workpiece, and therefore prior to said annular sealing portion of said annular sealing ring being disposed in a compressed state between said sealing surface of said workpiece and said sealing surface of said recess portion of said head portion of said screw, while said annular web portion of said annular sealing ring has an axial depth which is less than said predetermined axial depth of said recess portion of said head portion of said screw so as to define an expansion space within said recess portion of said head portion of said screw into which said annular sealing portion of said annular sealing ring can expand when said screw is fully threadedly engaged within said workpiece and said annular sealing portion of said annular sealing ring is disposed in said compressed state so as to define a seal with said sealing surface of said workpiece.

2. The fastener assembly of claim 1 wherein the annular web portion extends radially inwardly from the sealing portion.

3. The fastener assembly of claim 2 wherein the annular web portion when unstressed has an inner diameter smaller than a major diameter of the threaded portion of the shank so as to retain the sealing ring on the screw.

4. The fastener assembly of claim 1 wherein the recess has an outer diameter and the sealing ring when unstressed has an outer diameter greater than the outer diameter of the recess.

5. An assembly as set forth in claim 1, wherein:
said screw and said workpiece are fabricated of metal; and
said sealing ring is fabricated from an elastomeric material.

6. An assembly as set forth in claim 1, wherein:
said sealing portion of said sealing ring is disposed radially outwardly of said web portion of said sealing ring such that said peripheral portion of said sealing portion of said sealing ring is disposed in peripheral contact with said outer peripheral surface of said recess portion of said head portion of said screw while said peripheral portion of said web portion of said sealing ring is disposed in peripheral contact with said inner peripheral surface of said recess portion of said head portion of said screw.

7. An assembly as set forth in claim 1, wherein:
said annular web portion of said sealing ring is disposed within a plane which is located at an axial position with respect to said sealing portion of said sealing ring which is disposed centrally of said axial depth of said sealing portion of said sealing ring.

8. An assembly as set forth in claim 1, wherein:
said assembly comprises a drain plug for an oil pan of an internal combustion engine.

9. An assembly as set forth in claim 5, wherein:
said elastomeric material comprises polypropylene.

10. An assembly as set forth in claim 1, wherein:
said axial depth of said web portion of said sealing ring is approximately one-half said axial depth of said sealing portion of said sealing ring.

* * * * *